Feb. 13, 1934.     R. BRAILLARD ET AL     1,947,326
DIRECT READING RADIO COMPASS
Filed March 31, 1932     2 Sheets-Sheet 1
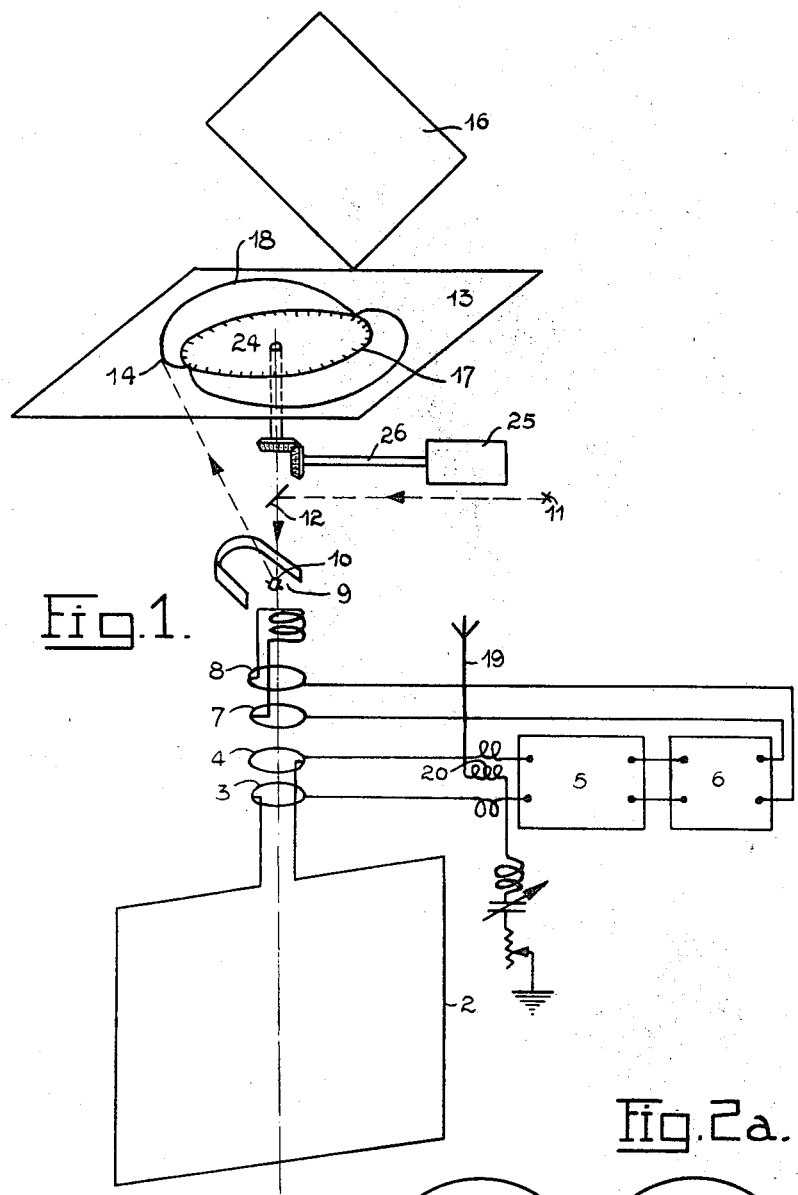
Fig.1.
Fig.2a.
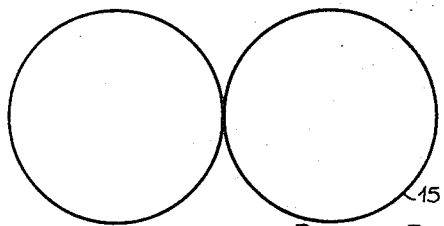
INVENTOR
RAYMOND BRAILLARD
JEAN MARIQUE
By Emil Bönnelycke
ATTORNEY Feb. 13, 1934.  R. BRAILLARD ET AL  1,947,326

DIRECT READING RADIO COMPASS

Filed March 31, 1932  2 Sheets-Sheet 2

INVENTOR
RAYMOND BRAILLARD
JEAN MARIQUE
By Emil Bönnelycke
ATTORNEY

Patented Feb. 13, 1934

1,947,326

UNITED STATES PATENT OFFICE 1,947,326

DIRECT-READING RADIO-COMPASS

Raymond Braillard and Jean Marique, Uccle, Belgium

Application March 31, 1932, Serial No. 602,350, and in Belgium April 3, 1931

6 Claims. (Cl. 250—11)

The present invention refers to a direct-reading radio compass of the type in which the high frequency current generated by incoming electromagnetic waves in a direction-finder exploring system turning at a speed of the order of 10 revolutions per second, is passed, after detection, to a mirror-galvanometer which reflects a beam of light on a screen. The galvanometer system revolves with the exploring system in such a manner that the luminous spot traces on the cylindrical screen a curve of sinusoidal nature corresponding to the variation of the rectified current.

An apparatus according to the present invention is represented in the accompanying drawings.

Figure 1 illustrates a radio compass according to the invention.

Figs. 2a, 2b and 2c illustrate curves which may be obtained by means of a radio compass according to the invention.

Figure 2B:
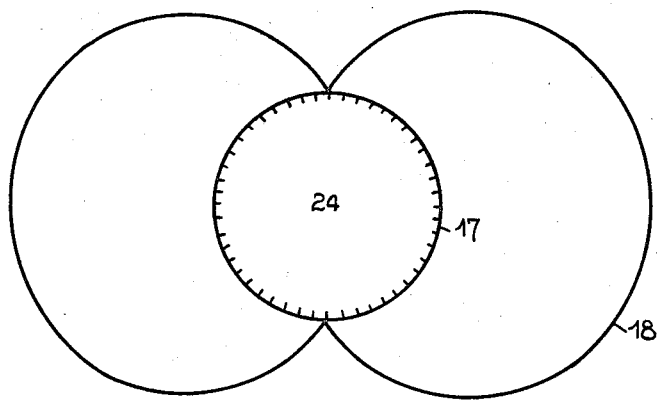

In Figure 1, there is represented a rotatable exploring system 2. The high frequency current generated in this system by a high frequency oscillation is collected by friction contacts 3 and 4. It is amplified in an amplifier 5 and then detected in a detector 6 from which it is sent to friction contacts 7 and 8 of a mirror-galvanometer 9. This galvanometer is rotated with the exploring system. Its mirror 10 receives a beam of light from a source of light 11 by the intermediary of a fixed mirror 12. The beam of light is reflected by the mirror 10 of the galvanometer on a screen 13 in frosted glass. This screen is defined by a surface which is intersected by a line representing the axis of rotation of the galvanometer. Preferably the screen, as represented in Fig. 1, is perpendicular to the axis of rotation of the galvanometer. The screen represented is flat but could be curved, for example in the form of a segment of a sphere. The condition to be realized is that the whole luminous curve traced by the spot 14 on the screen when the galvanometer is rotating at a sufficient speed, may be seen at one glance.

In these conditions, at each revolution, the spot 14 traces on the screen a polar figure derived from the well-known 8-shaped curve 15 (Fig. 2a). This curve is seen completely and without interruption if the speed of rotation is at least of about 10 revolutions per second. It is obvious that an optical system suitably arranged would allow of the polar figure being reflected on another screen having any desired orientation with reference to the axis of rotation of the exploring system. In the example shown, the curve is seen at right angles by the intermediary of a mirror 16 inclined at 45° relatively to the axis of rotation of the galvanometer.

To make the readings easier, the light beam can be given an initial deviation so that when no transmission is taking place, the spot of light meets the screen 13 at a certain distance from the axis of rotation of the galvanometer and by the rotation of the latter describes a luminous circle of a certain diameter (for example 10 centimeters). This initial deviation is obtained by giving to the mirror 10 an initial inclination. A graduated circle 17 can be engraved on the screen 13 so as to coincide with this luminous circle. When a transmission is received, the radial displacement of the spot of light varies with the rectified current received by the galvanometer; the spot is, therefore, constantly outside the graduated circle except for those positions of the exploring system corresponding to extinction of the received signals. This gives a curve 18 such as is shown in Figure 2b. As extinction takes place at well determined orientations of the exploring system relative to the direction of the transmitter, it is easy to deduce this direction therefrom.

Figure 2C:
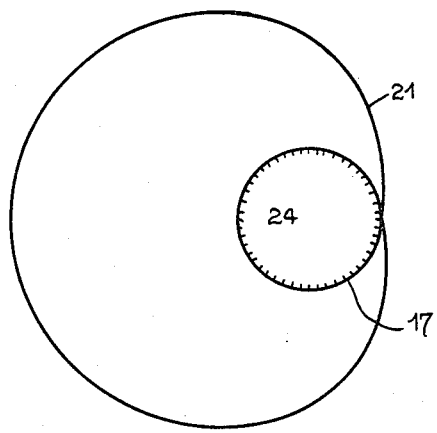

With the curves of Figures 2a and 2b there remains an ambiguity of 180° about the direction of the transmitter. For removing this ambiguity by the apparatus itself there is used an open aerial such as an antenna 19, the high frequency current generated in this open aerial by incoming electromagnetic waves is combined, by means of a coupling coil 20, with high frequency current simultaneously generated in the exploring system by the same electromagnetic waves. In this case, the curve traced by the spot is no more a curve derived from the well known 8-shaped but derived from the well-known cardioid diagram. By giving an initial inclination to the mirror 10, the curve obtained is like the curve 21 of Fig. 2c.

The principal advantage of this new arrangement is that the whole curve can be seen at one glance, which is impossible with a cylindrical screen. The mere appearance of the curve enables the operator to judge if the reading is taken in good conditions. On the other hand, the continual presence of a curve faithfully following the modifications of the field during those periods in which anomalies of propagation occur, abolishes the necessity of "minimum chasing" which renders aural measurements difficult.

A second advantage is that it is possible to fix at the centre of the screen an optical system such as the fixed mirror 12 allowing the use of a fixed source of light such as 11.

The direction finder exploring system can be placed at a distance from the galvanometer system, provided they are made to revolve synchronously and in phase. In this way, the frosted glass screen may be fixed in any position for example on a control panel amongst other measuring instruments.

Figure 3:
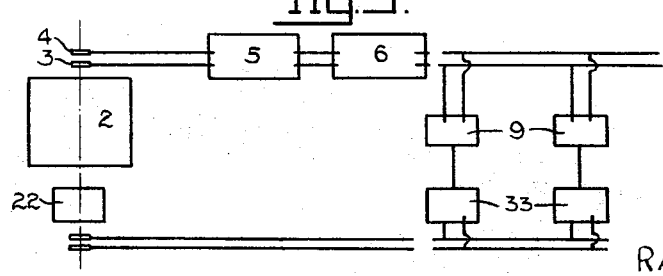
Fig. 3 shows a modification of the invention in which use is made of a number of galvanometers placed with the corresponding screen at a distance from a single exploring system.

Further the rectified current may be sent to several galvanometer systems which are made to revolve synchronously and in phase with the exploring system. Such a disposition is represented in Figure 3. The direction finder 2 and the different galvanometers 9, placed at a distance from it, are made to revolve by synchronous motors. The direction-finder is revolved directly by the axis of the generator of current 22. Each galvanometer is revolved by a synchronous motor 33 receiving current from the generator 22. Each galvanometer receives detected current from the common detector 6. One revolving exploring system, suitably placed in relation to the electro-magnetic field is thus sufficient for the distribution of the measurements to places where a direction-finder cannot be installed: this property can be particularly useful on board vessels and aircraft.

Attention may usefully be drawn to the fact that all that has been said above with regard to the direction-finder exploring system is equally true whether applied to a revolving frame, to any other direction-finder exploring system (for example, those of Bellini-Tosi, Adcock, etc.) or to any other form of aerial, (particularly those which may be used for ultra short-wave working).

The screen may be combined with all types of indicating devices such as a magnetic or gyroscopic compass, or with a drift-correcting device, or with both these instruments simultaneously.

In this case, these instruments may cause the rotation of the said graduated circle 17 which is traced on a rotatable part 24 of the screen 13 in order that the readings made on the curve 21 be directly given in function of the indications of said instruments. In Figure 1, such an instrument, for example a magnetic or gyroscopic compass, is represented at 25 and its movement is transmitted to the part 24 by a connection 26.

We claim as our invention:

1. A direct-reading radio-compass, comprising a rotatable direction-finder exploring system, means for continuously rotating said system at a speed at the minimum equal to about ten revolutions per second, a mirror galvanometer, means for rotating the said galvanometer synchronously and in phase with the said exploring system, means for causing high frequency current generated in said system by incoming electromagnetic waves to act on said galvanometer so as to deviate the same, a source of light disposed so as to project a beam of light on the mirror of the galvanometer, and a screen disposed so as to receive the beam of light reflected by the mirror of the galvanometer, the surface of said screen being intersected by the axis of rotation of the galvanometer.

2. A direct-reading radio-compass, comprising a rotatable direction-finder exploring system, means for continuously rotating said system at a speed at the minimum equal to about ten revolutions per second, a mirror galvanometer, means for rotating the said galvanometer synchronously and in phase with the said exploring system, means for causing the high frequency current generated in the said system by incoming electromagnetic waves to act on said galvanometer so as to deviate the same, a source of light disposed so as to project a beam of light on the mirror of the galvanometer, and a flat screen perpendicular to the axis of rotation of the galvanometer and disposed so as to receive the beam perpendicular to the axis of rotation of the galvanometer.

3. A direct-reading radio-compass, comprising a rotatable direction-finder exploring system, means for continuously rotating said system at a speed at the minimum equal to about ten revolutions per second, a mirror galvanometer, means for rotating the said galvanometer synchronously and in phase with the said exploring system, a screen perpendicular to the axis of rotation of the galvanometer, a source of light disposed so as to project a beam of light on the mirror of the galvanometer, means for giving to the mirror of the galvanometer an initial inclination such that the beam of light it reflects on the screen meets the latter at a certain distance from the axis of rotation of the galvanometer, and means for causing high frequency current generated in the said system by incoming electromagnetic waves to act on said galvanometer so as to deviate the same from its initial position.

4. A direct-reading radio-compass, comprising a rotatable direction-finder exploring system, means for continuously rotating said system at a speed at the minimum equal to about ten revolutions per second, a mirror galvanometer, means for rotating the said galvanometer synchronously and in phase with the said exploring system, a screen perpendicular to the axis of rotation of the galvanometer, a source of light disposed so as to project a beam of light on the mirror of the galvanometer, means for giving to the mirror of the galvanometer an initial inclination such that the beam of light it reflects on the screen meets the latter at a certain distance from the axis of rotation of the galvanometer, a graduated circle on the screen whose radius is equal to the aforesaid distance, and means for causing high frequency current generated in the said system by incoming electromagnetic waves to act on said galvanometer so as to deviate the same from its initial position.

5. A direct-reading radio-compass, comprising a rotatable direction-finder exploring system, means for continuously rotating said system at a speed at the minimum equal to about ten revolutions per second, an open aerial, means for combining high frequency currents generated in the said open aerial and exploring system by incoming electromagnetic waves, a mirror galvanometer, means for rotating the said galvanometer synchronously and in phase with the said exploring system, a source of light disposed so as to project a beam of light on the mirror of the galvanometer, a screen perpendicular to the axis of rotation of the galvanometer and disposed so as to receive the beam of light reflected by the mirror of the galvanometer, and means for causing the combined high frequency current to act on the said galvanometer so as to deviate the same and cause the beam of light to trace a polar curve on the screen during rotation of the galvanometer.

6. A direct-reading radio-compass, comprising a rotatable direction-finder exploring system, means for continuously rotating said system at a speed at the minimum equal to about ten revolutions per second, a mirror galvanometer, means for rotating the said galvanometer synchronously and in phase with the said exploring system, a screen perpendicular to the axis of rotation of the galvanometer, a source of light disposed so as to project a beam of light on the mirror of the galvanometer, means for giving to the mirror of the galvanometer an inclination such that the beam of light it reflects on the screen meets the latter at a certain distance from the axis of rotation of the galvanometer, said screen having a graduated circle on a rotatable part thereof, whose radius is equal to the aforesaid distance, another indicating device, a connection between this indicating device and the rotatable part of the screen so as to shift this rotatable part according to the indications of the indicating device, and means for causing the high frequency current generated in the said system by incoming electromagnetic waves to act on said galvanometer so as to deviate the same from its initial position.

RAYMOND BRAILLARD.
JEAN MARIQUE.